United States Patent
Badel et al.

(10) Patent No.: US 9,012,567 B2
(45) Date of Patent: Apr. 21, 2015

(54) SUPRAMOLECULAR POLYMERS AND COMPOSITIONS CONTAINING SAID POLYMERS

(75) Inventors: Thierry Badel, Lyons (FR); Stéphane Jeol, Lyons (FR); Franck Touraud, Eyzin Pinet (FR)

(73) Assignee: Rhodia Operations, Paris (FR)

( * ) Notice: Subject to any disclaimer, the term of this patent is extended or adjusted under 35 U.S.C. 154(b) by 184 days.

(21) Appl. No.: 13/388,674

(22) PCT Filed: Jul. 30, 2010

(86) PCT No.: PCT/EP2010/061092
§ 371 (c)(1),
(2), (4) Date: Apr. 16, 2012

(87) PCT Pub. No.: WO2011/015525
PCT Pub. Date: Feb. 10, 2011

(65) Prior Publication Data
US 2012/0289652 A1    Nov. 15, 2012

(30) Foreign Application Priority Data

Aug. 6, 2009  (FR) ..................................... 09 03878

(51) Int. Cl.
C08G 69/14 (2006.01)
C08L 77/02 (2006.01)
C08G 73/06 (2006.01)
C08G 83/00 (2006.01)

(52) U.S. Cl.
CPC .............. *C08G 73/06* (2013.01); *C08G 83/008* (2013.01); *Y10S 977/742* (2013.01); *Y10S 977/70* (2013.01)

(58) Field of Classification Search
USPC ................... 524/607; 528/325, 326; 525/436; 977/700, 742
See application file for complete search history.

(56) References Cited

U.S. PATENT DOCUMENTS

| | | | |
|---|---|---|---|
| 3,763,091 | A | 10/1973 | Crescenzi et al. |
| 3,876,583 | A | 4/1975 | Lee et al. |
| 6,320,018 | B1 | 11/2001 | Sijbesma et al. |
| 6,683,151 | B1 | 1/2004 | Loontjens et al. |
| 2002/0072601 | A1* | 6/2002 | Mathias et al. ............... 540/357 |
| 2005/0148760 | A1 | 7/2005 | Tournilhac et al. |
| 2007/0123694 | A1 | 5/2007 | Tournilhac et al. |
| 2008/0167442 | A1 | 7/2008 | Tournilhac et al. |
| 2009/0111930 | A1 | 4/2009 | van Gemert et al. |

FOREIGN PATENT DOCUMENTS

| | | |
|---|---|---|
| EP | 1031589 A1 | 8/2000 |
| EP | 1136506 A1 | 6/2001 |
| EP | 1465930 | 10/2004 |
| JP | 9-151249 A | 6/1997 |
| JP | 9-151252 A | 6/1997 |
| NL | 7104415 A | 10/1971 |
| WO | WO 01/07396 A | 2/2001 |
| WO | WO 03/059964 A2 | 7/2003 |
| WO | WO 2006/006855 A | 1/2006 |

OTHER PUBLICATIONS

Akerlund et al., "Diketopiperazine-Based Polymers from Common Amino Acids" J. of Applied Polymer Science, 2000, pp. 2213-2218; vol. 78, No. 78.*

International Search Report (PCT/ISA/210) issued on Jan. 12, 2011, by European Patent Office as the International Searching Authority for International Application No. PCT/EP2010/061092.

Palacin et al., "Hydrogen-Bonded Tapes Based on Symmetrically Substituted Diketopiperazines: A Robust Structural Motif for the Engineering of Molecular Solids", J. Am. Chem. Soc., 1997, pp. 11807-11816, vol. 119, American Chemical Society.

Akerlund et al., "Diketopiperazine-Based Polymers from Common Amino Acids", Jr. of Applied Polymer Science, 2000, pp. 2213-2218; vol. 78, No. 78, XP009132854.

* cited by examiner

*Primary Examiner* — Robert D. Harlan
(74) *Attorney, Agent, or Firm* — Dentons US LLP

(57) ABSTRACT

Supramolecular polymers having repeat units connected by hydrogen bonds, where the repeat units are monomers, macromers, oligomers or polymers where at least one on the monomers contains at least one 2,5-diketopiperazine group are described. Composition prepared from these supramolecular polymers and articles produced from these compositions are also described.

27 Claims, No Drawings

SUPRAMOLECULAR POLYMERS AND COMPOSITIONS CONTAINING SAID POLYMERS

This application is the United States national phase of PCT/EP2010/061092, filed Jul. 30, 2010, and designating the United States (published in the French language on Feb. 10, 2011, as WO 2011/015525), which claims priority under 35 U.S.C. §119 of FR 0903878, filed Aug. 6, 2009, each hereby expressly incorporated by reference in its entirety and each assigned to the assignee hereof.

The present invention relates to supramolecular polymers and to the compositions containing said polymers.

It is known that supramolecular polymers and compounds contain groups which form reversible physical interactions (or noncovalent bonds) with one another, in particular hydrogen bonds, whereas, in a conventional polymer, the repeat units are connected to one another via covalent bonds. In general, supramolecular chemistry is therefore defined as the chemistry of multiple oriented noncovalent cooperative interactions. On the basis of this concept, supramolecular polymers are polymers in which the repeat units are monomers or oligomers of low weights, connected to one another via noncovalent bonds. A major advantage of these supramolecular polymers is that these intramolecular physical interactions are reversible.

Patent EP 1465930 describes supramolecular polymers containing imidazolidone units. U.S. Pat. No. 6,320,018 describes supramolecular polymers containing units having ureidopyrimidone groups. Patent application EP 1 031 589 describes supramolecular polymers containing units having urea or carbamate functions (product of reaction of isocyanates with nitrogenous compounds). Patent application EP 1 136 506 describes supramolecular polymers containing units having glutarimide functions. Patent application WO 01/07396 describes supramolecular polymers containing aromatic units bearing both hydroxyl functions and carboxylic acid functions.

There is still a need in industry for the development of polymers and materials which can be prepared simply from economically accessible raw materials and in sufficient amounts and which make it possible to produce materials with advantageous properties. The supramolecular polymers of the present invention meet this need and in addition offer the advantage of novel balances between properties, which are inaccessible with conventional polymers.

The present invention proposes supramolecular polymers in which the repeat units are monomers or macromers which can be produced simply and economically from accessible raw materials. It in fact relates to a supramolecular polymer comprising repeat units linked to one another via hydrogen bonds and at least one of said repeat units of which contains a 2,5-diketopiperazine group (hereinafter referred to as "DKP group").

Preferably, at least one of said repeat units is a 2,5-diketopiperazine group (DKP group).

The 2,5-diketopiperazine group (DKP group) can in particular correspond to general formula (1):

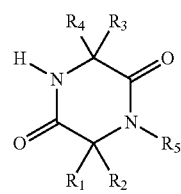

(1)

in which $R_1$, $R_2$, $R_3$, $R_4$ and $R_5$, which may be identical or different, represent:
- an atom, in particular H, or
- a saturated or unsaturated, linear, branched, comb or star hydrocarbon-based group which can optionally contain one or more heteroatoms.

As indicated above, the hydrocarbon-based groups $R_1$, $R_2$, $R_3$, $R_4$ and $R_5$ can optionally contain one or more heteroatoms which are generally selected from N, O, S, Si, P and halogens, preferably chlorine.

The hydrocarbon-based group is preferably selected from:
- a cycloalkyl group containing from 3 to 20 carbon atoms, and preferentially from 4 to 12 atoms, which can optionally contain one or more heteroatoms, for example a cyclohexyl,
- an aromatic group containing from 6 to 20 carbon atoms, which can optionally contain one or more heteroatoms, for instance a phenyl group or a hydroxyphenyl group,
- an alkyl group containing from 1 to 20 carbon atoms, preferably from 1 to 10 carbon atoms,
- an alkylaryl or arylalkyl group containing from 6 to 20 carbon atoms, preferably from 6 to 10 carbon atoms, which can optionally contain one or more heteroatoms, for instance a benzyl or a tolyl.

The $R_1$, $R_2$, $R_3$, $R_4$ and $R_5$ groups defined above, which may be identical or different, can also contain one or more H-bond donor and/or acceptor groups.

$R_1$, $R_2$, $R_3$, $R_4$ and $R_5$, which may be identical or different, can also represent a conventional polymer or oligomer (i.e. the repeat units of which are linked to one another via covalent bonds) which can optionally contain one or more heteroatoms, such as polyoxyalkylenes, in particular polyoxyethylene and polyoxypropylene, polyamides, polyesters, polyureas, polyurethanes, polyacrylic acids and derivatives thereof, polyolefins, polyvinyls and polystyrenes. These polymers can be saturated or unsaturated and linear, branched, comb or star.

When $R_1$, $R_2$, $R_3$, $R_4$ and $R_5$, which may be identical or different, are conventional polymers or oligomers as defined above, the repeat units of these conventional polymers or oligomers, linked to one another via covalent bonds, can also contain one or more H-bond donor and/or acceptor groups. When the repeat units of these conventional polymers or oligomers contain H-bond donor and/or acceptor groups, then these repeat units are different than DKP.

Examples of H-bond donor and/or acceptor groups (or functions) are amines (primary, secondary, tertiary), alcohols (primary, secondary, aromatic), thiols, carboxylic acids, esters, amides (primary, secondary, tertiary), imides, thioamides, ethers, sulfides, imines, azos, sulfones, sulfonates, sulfonamides, ureas, ureidos, guanidos, 2,5-diketopiperazines, pyroglutamics, glutarimides, imidazolidones, cyanos, carbamates, ketones, aldehydes, carbonates, silanols, halogens, metal hydroxides, and metal carbonyls.

The term "metal carbonyls" will be intended to mean, for example, metal salts of carboxylic acids.

In the supramolecular polymer of the invention, the interactions via hydrogen bonds between two repeat units that can take place are in particular:
- an interaction between the rings of the 2,5-diketopiperazine group of formula (1) hereinafter referred to as DKP rings. Indeed, each DKP ring bears two (carbonyl) H-acceptor functions and at least one (NH amide) H-donor function and can interact via hydrogen bonding with any respectively H-donor and H-acceptor group, in particular another DKP ring. Formula (2) below represents a possible example of interaction between two DKP rings:

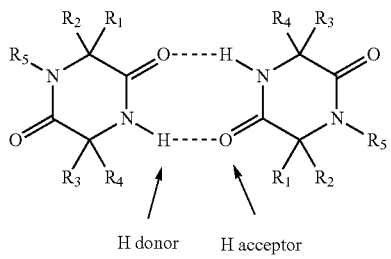

(2)

H donor    H acceptor

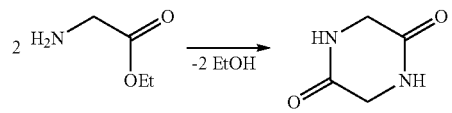

(4)

Likewise, the reaction scheme using α-amino acids can be set out as follows:

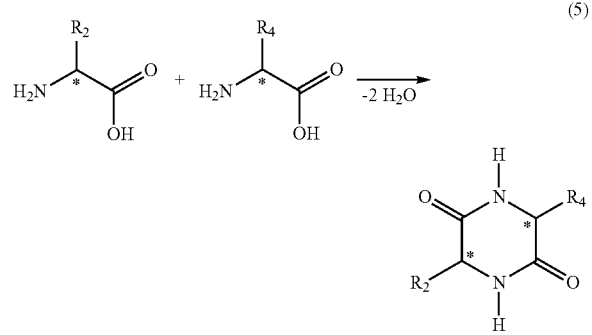

(5)

- an interaction between one or more H-bond donor and/or acceptor groups borne by the $R_1$, $R_2$, $R_3$, $R_4$ and $R_5$ groups of the DKP group and a DKP ring of another DKP group. Indeed, since each DKP ring bears two (carbonyl) H-acceptor functions and at least one (NH amide) H-donor function, it can interact via hydrogen bonding with any respectively H-donor and H-acceptor group,
- an interaction between one or more H-bond donor and/or acceptor groups borne by the $R_1$, $R_2$, $R_3$, $R_4$ and $R_5$ groups of a DKP group and one or more H-bond donor and/or acceptor groups borne by the $R_1$, $R_2$, $R_3$, $R_4$ and $R_5$ groups of another DKP group,
- an interaction between a DKP ring of a DKP group and one or more H-bond donor and/or acceptor groups borne by another repeat unit, different than a DKP group,
- an interaction between one or more H-bond donor and/or acceptor groups borne by the $R_1$, $R_2$, $R_3$, $R_4$ and $R_5$ groups of a DKP group and one or more H-bond donor and/or acceptor groups borne by another repeat unit, different than a DKP group.

Several types of interactions via hydrogen bonds among those mentioned above can take place in the supramolecular polymer of the invention.

According to one preferred embodiment, the 2,5-diketopiperazine group of formula (1) is such that $R_1=R_3=H$ and $R_2$, $R_4$ and $R_5$ are a substituent as defined previously, as shown on scheme (3).

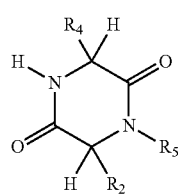

(3)

These 2,5-diketopiperazine groups of formula (1) can be prepared from amino acids or from derivatives thereof, according to techniques known to those skilled in the art, in particular by heating amino acids or linear dipeptides, by depolymerization of a polyamino acid or polypeptide, or by peptide synthesis (of Merrifield type).

The synthesis can be carried out under bulk or solution conditions, or under dispersion conditions.

The reaction kinetics can be accelerated by raising the temperature, by catalysis or under reduced pressure.

The synthesis of 1,4-H 2,5-diketopiperazine or glycine anhydride can be carried out, for example, using the ester of glycine by heating optionally at a temperature above ambient temperature, according to the reaction scheme:

The α-amino acids that can be used may be of natural origin, the most well known of which are L-alanine, L-arginine, L-asparagine, L-aspartic acid, L-cysteine, L-glutamic acid, L-glutamine, glycine, L-histidine, L-isoleucine, L-leucine, L-lysine, L-methionine, L-phenylalanine, L-proline, L-serine, L-threonine, L-tryptophan, L-tyrosine, L-valine, L-selenocysteine and L-pyrrolysine.

Many other α-amino acids also exist in the natural environment. More than 300 α-amino acids are thus listed (cf. Handbook of Biochemistry and Molecular Biology, $3^{rd}$ Edition, CRC Press, 1982).

A wide diversity of side groups R is available and can be judicially employed for modulating the desired and obtained properties of diketopiperazine and of the derived supramolecular polymers or compounds.

These are, inter alia:
- α-amino acids with linear or branched alkyl side groups, such as α-aminobutyric acid, α-aminoheptanoic acid, α-aminooctanoic acid, α-aminoisobutyric acid, homoisoleucine or α-amino-4-methylhexanoic acid, and α-aminoadipic acid,
- α-amino acids with linear or branched aryl or arylalkyl side groups, such as α-amino-β-phenylbutyric acid,
- α-amino acids with cycloaliphatic side groups, such as 1-aminocyclopropane-1-carboxylic acid,
- α-amino acids with unsaturated aliphatic side groups, such as 2-amino-3-formyl-3-pentenoic acid, α-amino-4-hexenoic acid, α-amino-4-methylhex-4-enoic acid, hypoglycine A, α-amino-5-methylhex-4-enoic acid and α-(methylenecyclopropyl)glycine,
- α-amino acids with side groups bearing carboxylic functions or derivatives, such as α-aminopimelic acid, ethylasparagine, N-isopropylglutamine, N-methylasparagine, β-methylaspartic acid, γ-methylglutamic acid, theanine and m-carboxylphenylalanine,
- α-amino acids bearing amine side groups or derivatives, such as N-acetylornithine, α-amino-γ-N-acetylaminobutyric acid, α-amino-3-dimethyl-aminopropionic acid, α-amino-β-methylamino-propionic acid, α,γ-diaminobutyric acid α,β-diaminopropionic acid, ε-N-methyllysine and β-N-oxalyl-α,β-diaminopropionic acid, α-amino acids bearing hydroxyl functions or derivatives: O-acetylhomoserine, 2-amino-4,5-dihydroxypentanoic acid, α-amino-γ-hydroxyadipic acid, α-amino-6-hydroxyaminohexanoic acid, α-amino-γ-hydroxybutyric acid, α-amino-δ-hydroxy-valeric acid, α-amino-β-methyl-γ,δ-dihydroxy-isocaproic acid, O-butylhomoserine, β,γ-dihydroxy-isoleucine, γ,δ-dihydroxyisoleucine, O-ethyl-homoserine, homoserine, α-hydroxyalanine, β-hydroxyasparagine, β-hydroxyaspartic acid, β-hydroxyglutamic acid, γ-hydroxyglutamic acid, β-hydroxyleucine, δ-hydroxyleucine, threo-β-hydroxyleucine, γ-hydroxynorvaline, α-hydroxy-valine, γ-hydroxyvaline, γ-methyl-γ-hydroxyglutamic acid, pantonine, O-propylhomoserine, O-succinyl-homoserine, 2,4-dihydroxy-6-methylphenylalanine, 3,4-dihydroxyphenylalanine, 3,5-dihydroxyphenyl-glycine, m-hydroxyphenylglycine, O-methyltyrosine and m-tyrosine, α-amino acids bearing ketone or aldehyde functions: α-amino-β-ketonutyric acid and 4-ketonorleucine, ureido and guanido derivatives, such as albizziin, canavanine, canavanosuccinic acid, citrulline, gigartinine, homoarginine, homocitrulline, γ-hydroxyarginine, γ-hydroxyhomoarginine and indospicine, cyano and azo derivatives, such as alanosine, azaserine, β-cyanoalanine, ε-diazo, hadacidin and Lathyrus factor, heterocycles, such as echinine, 2-hydroxytryptophan, (-hydroxytryptophan, ibotenic acid, indole-3-acetyl-ε-lysine, lathytine, β-methyltryptophan, mimosine, muscazone, β-3-oxindolylalanine, β-pyrazol-1-ylalanine, stizolobic acid, stizolobinic acid and tricholomic acid.

The side groups $R_1$ to $R_5$ can also bear combinations of several functions, for instance:

simultaneously a carboxylic acid or derivative and an unsaturation: γ-ethylideneglutamic acid, N-fumarylalanine, γ-methyleneglutamic acid;

simultaneously acid and amine functional groups or derivatives, for instance N-ε-(2-amino-2-carboxy-ethyl) lysine, N-δ-(2-amino-2-carboxy-ethyl)ornithine, α,ε-diaminopimelic acid, 2,3-diaminosuccinic acid, tabtoxinine;

simultaneously hydroxyl groups and unsaturations: α-amino-6-hydroxy-4-methylhex-4-enoic acid, α-amino-3-hydroxymethyl-3-pentenoic acid, δ-hydroxyleucenine;

simultaneously hydroxyl and acid groups or derivatives: α-amino-γ-hydroxypimelic acid, β,γ-dihydroxyglutamic acid, N-(2-hydroxy-ethyl)asparagine, N-(2-hydroxyethyl)glutamine, γ-hydroxyglutamine, 3-carboxy-4-hydroxyphenylalanine;

simultaneously hydroxyl and ketone groups: δ-hydroxy-γ-ketonorvaline; and simultaneously hydroxyl and amine groups: α-hydroxylysine, δ-hydroxylysine, ε-hydroxylaminonorleucine, γ-hydroxyornithine, 3-hydroxykynurenine (additional ketone), kynureine (additional ketone).

These functions and combinations of functions are only cited by way of nonlimiting examples. Numerous other combinations of functions are also possible, either in the form of naturally available α-amino acids, or resulting from organic syntheses, or chemical or biochemical modification.

The α-amino acids of natural origin can also be obtained by any other route, such as fermentation by various bacterial strains or microorganisms, which may or may not be genetically modified, using various substrates, just as by organic or enzymatic synthesis of any other synthesis route known to those skilled in the art.

The 2,5-diketopiperazine groups can also be synthesized from unnatural α-amino acids.

The preferred nonfunctional α-amino acids are typically glycine, valine, leucine, isoleucine and phenylalanine.

Examples of functional α-amino acids are arginine, glutamine, asparagine, tryptophan, histidine, proline, tyrosine, lysine, aspartic acid, glutamic acid, tyrosine, serine, arginine, glutamine, asparagine, proline and threonine.

The majority of the α-amino acids have a chiral center on the carbon in position 2. Two isomers are therefore possible: the dextrorotary isomer (denoted D) and the levorotary isomer (denoted L). The α-amino acids exist mainly in the L form in the natural state. The D forms nevertheless also exist, and are just as capable of forming 2,5-diketopiperazine groups. This technology therefore covers without distinction the D forms and the L forms of the various α-amino acids concerned, and also mixtures thereof.

Depending on the nature, of the radicals $R_1$ to $R_4$, the DKP ring can therefore have up to two chiral centers conferring optical isomerism.

This technology also makes no distinction regarding the combination of the chiral centers of the two α-amino acids. The 2,5-diketopiperazine groups bearing two chiral centers can therefore be in the DD, DL, LD or LL form, those bearing just one chiral center in the D or L form. Finally, the 2,5-diketopiperazine groups may be completely achiral, if the two α-amino acids constituting same do not bear any chiral centers, and so on; if one or more side groups $R_1$ to $R_5$ borne by one or more α-amino acids constituting the 2,5-diketopiperazine group also comprises one or more chiral centers, all combinations can be envisioned.

Finally, the 2,5-diketopiperazine groups can also be as a mixture of various optical isomers or diastereoisomers, for example a mixture of pure D, D and of pure L, L, or a mixture of D, L and of L, D.

The DKP group of formula (1) can consist of two α-amino acids which are identical or different, according to all the criteria mentioned above: substituent, chirality.

All the DKP groups obtained from the α-amino acids mentioned above can also be chemically modified in order to introduce new functions, functionality or donor/acceptor groups.

More preferentially, the 2,5-diketopiperazine group of formula (1) is such that $R_1=R_3=R_5=H$ and $R_2$ and $R_4$ are substituents as defined previously, which may be identical or different.

The DKP group of formula (1) can be substituted symmetrically. A preferential example of this category of DKP group is represented in scheme (6):

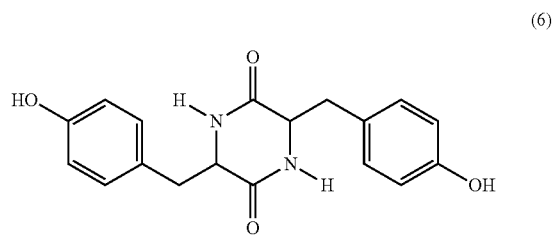 [SMILES: O=C1NC(Cc2ccc(O)cc2)C(=O)NC1Cc1ccc(O)cc1]

(6)

The DKP group of formula (1) can also be substituted nonsymmetrically. An example of this category of DKP group is represented in scheme (7):

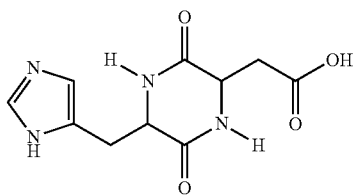

(7)

As previously mentioned, the radicals $R_1$, $R_2$, $R_3$, $R_4$ and $R_5$ can optionally contain one or more H-bond donor/acceptor groups (different than a DKP group when $R_1$, $R_2$, $R_3$, $R_4$ and $R_5$ are conventional polymers or oligomers and when these groups are borne by the repeat units of said conventional polymers or oligomers). These donor/acceptor groups can originate from the α-amino acids selected for the synthesis of the DKP group or else be subsequently introduced by chemical modification of the DKP group.

The H-bond donor/acceptor groups are, inter alia, those previously defined. One particular preferential case is that of the 2,5-diketopiperazine groups. The 2,5-diketopiperazine group of formula (1) can therefore also contain a 2,5-diketopiperazine group within its radicals $R_1$, $R_2$, $R_3$, $R_4$ and $R_5$, as shown by the following examples of units of formula 8 and 9 below:

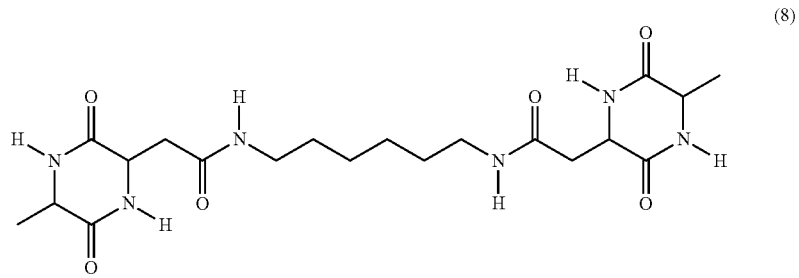

(8)

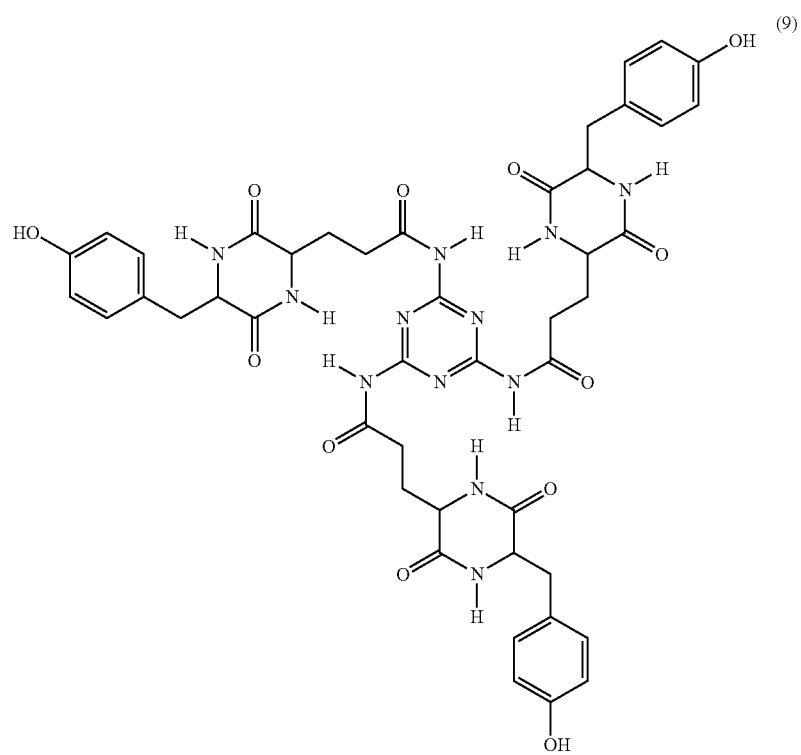

(9)

The supramolecular polymer according to the invention can optionally be obtained from a mixture of several DKP groups of formula (1).

The supramolecular polymer can also contain one or more repeat units different than the DKP groups of formula (1), interacting via H bonds with the DKP group of formula (1). These associated repeat units, different than the DKP group of formula (1), are molecules, macromers, oligomers or polymers bearing one or more H-bond donor and/or acceptor functions. The donor/acceptor functions of the DKP groups (1) can then interact via H bonds with the donor and/or acceptor function(s) borne by this or these associated repeat unit(s).

The associated repeat unit(s) different than the DKP groups of formula (1) may be organic, oligomeric, polymeric, inorganic or mineral, metallic, organometallic, judiciously selected and mixed with the DKP groups.

Examples of H-bond donor and/or acceptor functions are amines (primary, secondary, tertiary), alcohols (primary, secondary, aromatic), thiols, carboxylic acids, esters, amides (primary, secondary, tertiary), imides, thioamides, ethers, sulfides, imines, azos, sulfones, sulfonates, sulfonamides, ureas, ureidos, guanidos, pyroglutamics, glutarimides, imidazolidones, cyanos, carbamates, ketones, aldehydes, carbonates, silanols, halogens, metal hydroxides and metal carbonyls.

Examples of organic molecules used as repeat units associated with the DKP groups are amines such as hexamethylenediamine or melamine, amino acids such as 6-aminocaproic acid or 11-aminoundecanoic acid, diacids such as adipic acid or terephthalic acid, alcohols such as hydroquinone, ureides such as urea, and molecules bearing imidazolidone functions.

Examples of oligomers or polymers used as repeat units associated with the DKP groups are polyamides or copolyamides (6, 11, 12, 46, 66, 610, 6T, MXD6), polyurethanes, polyureas, polyesters (PET, PBT, PTT, PLA), polyesteramides, polyimines, polycarbonates, polyethers such as polyethylene glycols, and Jeffamines.

Examples of inorganic associated repeat units are silica, and aluminosilicates and derivatives, which may be lamellar or nonlamellar.

The supramolecular polymer can be composed of any possible combination of the alternatives described above.

The supramolecular polymer can be prepared by means of any of the techniques known to those skilled in the art, such as mixing the various units making up said polymer in solution, in suspension, in an emulsion, by molten mixing, or as solids. According to one particular embodiment, the repeat units associated via hydrogen bonds and which are constituents of the supramolecular polymer are mixed in solution, in suspension, in an emulsion, by molten mixing, or as solids.

The present invention is also directed toward the compositions prepared from the supramolecular polymers as defined above and which can be formed so as to produce an object/article having particular properties suitable for a specific use.

A supramolecular composition will therefore be composed at least of molecules which are organic or oligo/polymers, which are associated with one another according to the principle of supramolecular chemistry.

More specifically, according to the present invention, the polymer comprising repeat units linked to one another via hydrogen bonds and at least one of said repeat units of which is a DKP group of formula (1) can therefore be the only constituent or one of the constituents used in the production of the compositions according to the invention. In the compositions according to the invention, the properties will be totally or partly provided by the supramolecular interactions bringing about the involvement of the DKP groups (1).

The composition according to the invention is advantageously, at ambient temperature, in the form of a paste or a semicrystalline or amorphous solid.

Such a composition according to the invention which is, at ambient temperature, in the form of a paste or a semicrystalline or amorphous solid may be an elastomer, i.e. have an elastic nature and a glass transition temperature below ambient temperature.

For the purposes of the present invention, the term "in the form of a paste" will be intended to mean that the composition has a soft consistency and is malleable, at ambient temperature, by human strength alone.

For the purpose of the present invention, the term "in the form of a solid" will be understood to mean that the composition has a hard consistency and is not malleable, at ambient temperature, by human strength alone. For example, the composition may be in the form of granules.

For the purpose of the present invention, the term "semicrystalline" will be intended to mean that the composition has a glass transition temperature measurable by any conventional technique known to those skilled in the art, and that it comprises at least 5% of amorphous phase, preferably at least 10% and even more preferentially at least 15% of amorphous phase.

These compositions can also contain reinforcing or bulking fillers and, optionally, one or more additives known to those skilled in the art.

As reinforcing or bulking fillers, mention may in particular be made of glass fibers, carbon fibers, natural fibers, aramid fibers, and nanotubes, in particular carbon nanotubes. As natural fibers, mention may be made of hemp and flax. Mention may also be made of all lamellar particulate fillers and/or exfoliable or nonexfoliable nanofillers, such as alumina, carbon black, aluminosilicate clays, montmorillonites, zirconium phosphate, kaolin, calcium carbonate, diatomaceous earths, graphite, mica, silica, titanium dioxide, zeolites, talc, wollastonite or polymeric fillers, such as, for example, dimethacrylate particles, glass beads or glass powder.

It is entirely possible according to the invention for the composition to comprise several types of reinforcing fillers. These fillers can exhibit surface sizing which provides for adhesion or mechanical cohesion between the fibers and the matrix of supramolecular polymer.

The concentration by weight of the reinforcing or bulking fillers is advantageously between 0% and 60% by weight, relative to the total weight of the composition, preferably between 5 and 50%.

The composition according to the invention may also comprise additives conventionally used for the production of polymer compositions. Thus, mention may be made of lubricants, flame retardants, plasticizers, nucleating agents, impact modifiers, catalysts, light and/or heat stabilizers, antioxidants, antistatic agents, dyes, matting agents, molding aids or other conventional additives.

These fillers and additives can be added to the composition comprising the supramolecular polymer via usual means suitable for each filler or additive, such as, for example, during the synthesis of the supramolecular polymer or as a molten mixture.

The composition can also comprise, depending on the final property desired, a blend of supramolecular polymer according to the invention and one or more other polymers, which are not an integral part of the supramolecular polymer, i.e. which are not interacting by means of H bonds. In this category of polymers, mention may in particular be made, for example, of polyolefins, polystyrenes, polyvinyls, ABS resins, an elastomer resin or blends thereof.

The composition may comprise from 30 to 95% by weight of supramolecular polymer, relative to the total weight of the composition.

These compositions can be prepared by means of the techniques known to those skilled in the art, in particular by hot-mixing the various constituents, for example in a single-screw or twin-screw extruder, at a temperature sufficient to keep the supramolecular polymer in a molten medium; or cold-mixing of the various constituents in a mechanical mixer in particular.

The composition according to the invention can be used for any process for forming plastics, such as, for example, molding processes, in particular injection molding and rotomolding, extrusion processes such as extrusion-blow molding, spinning processes, film-forming processes, etc.

Generally, the mixture obtained is extruded in the form of rods which are cut into pieces so as to form granules. The various constituents of the composition and also the fillers and/or additives, as appropriate, can be added at any time in the process for producing the composition, in particular by hot or cold mixing.

The present invention thus also relates to an injection-molding process in which a composition according to the invention, in particular in the form of granules, is introduced into an injection-molding device, and the molding is carried out.

The particular properties of the compositions according to the invention, which are generally necessary for the specific uses, are, by way of example:
- the characteristic temperature of the composition which can be defined as the temperature at which a substantial amount of physical intermolecular or intramolecular interactions are formed between the various constituents of the composition. The physical interactions formed between the molecules can be at least partially broken, reversibly, in particular by raising the temperature above a transition temperature specific to the composition (Tg, T softening, Tm). These characteristic temperatures of the composition will define its field of use according to the properties sought. One advantage of these supramolecular polymers is that these hydrogen bonds are reversible. The compositions of the invention advantageously have a glass transition temperature (Tg) which is characteristic of the amorphous phase that they contain and which makes it possible to confer satisfactory mechanical properties on the articles obtained from these compositions. The glass transition temperature Tg of the composition of the invention is generally between −120° C. and 200° C., preferably between −50° C. and 150° C.;
- the dynamic viscosity: at a temperature above the temperature at which the composition is used, considerable fluidity can be obtained by partial or total rupture of the supramolecular interactions. At the temperature for use, the existence of these supramolecular interactions results in a higher viscosity (and also other application properties). For the compositions of the invention, the dynamic viscosity at the temperature for use and at a zero shear rate is advantageously greater than 10 Pa·s, preferably greater than 100 Pa·s, and even more preferentially greater than 1000 Pa·s. Above this temperature, the dynamic viscosity of the compositions according to the invention decreases, for example to a value of less than 1 Pa·s;
- the modulus: preferentially, the elastic modulus, at the temperature for use, is greater than $10^3$ Pascals, preferably greater than $10^5$ Pascals;

other properties can also be considered: impact strength, tensile strength, flexural strength, gas-barrier properties, liquid-barrier properties, electrical, electrostatic and thermal conductivity, oxidation, aging, solvent resistance, inflammability, dimensional stability, water uptake, scratch resistance, biodegradability, recyclability, adhesion, self-healing, surface finish, toxicity, etc.

The compositions according to the invention are characterized in that they are capable of being formed so as to produce an object/article, in particular by extrusion, injection-molding, molding, extrusion-blow molding, rotomolding or thermoforming. The resulting objects/articles have the particular properties mentioned above for the composition, said properties being suitable for the specific use for which the object/article is intended.

The present invention therefore also relates to the articles obtained by forming a composition according to the invention, by means of an extrusion, injection-molding, molding, extrusion-blow molding, rotomolding or thermoforming process.

They may, for example, be articles selected from the group consisting of injection-molded or molded parts, for example for motor vehicle applications, in the electronics and electrical industry, in the tool industry, in particular children's toys, and the film, clothing, powder, yarn, adhesive compositions and sealing composition fields.

A specific language is used in the description so as to facilitate the understanding of the principle of the invention. It should nevertheless be understood that no limitation of the scope of the invention is envisioned through the use of this specific language. Modifications, enhancements and improvements can in particular be envisioned by a person acquainted with the technical field concerned on the basis of their own general knowledge.

The term "and/or" includes the meanings and, or, and also all the other possible combinations of elements connected to this term.

EXAMPLES

The simplest α-amino acid 2,5-diketopiperazines are glycine anhydride (CASRN: 106-57-0) and alanine anhydride (CASRN: 5625-46-7). These are products that are commercially available for example, respectively, from Acros and from Sigma-Aldrich. The following products are commercially available: L-tyrosine methyl ester (CASRN: 1080-06-4), L-phenylalanine (CASRN: 63-91-2), adipic acid (CASRN: 124-04-9), hexamethylenediamine (CASRN: 124-09-4), polyamide 66 Technyl SB27A00 (CASRN: 32131-17-2), POGOL600 (CASRN: 25322-68-3), Jeffamine ED600 (CASRN: 65605-36-9).

The $^1$H NMR analyses were carried out at 300 K using a Bruker AV300 or Bruker AV500 apparatus, or finally using a Bruker DRX 300 MHz apparatus in deuterated dimethyl sulfoxide (DMSO-d6) or in deuterated trifluoroacetic acid (TFA-d1).

The mass spectrometry (MS) analyses were carried out on a Waters GCT Premier apparatus equipped with a Time-of-Flight (TOF) analyzer. The samples were analyzed by direct introduction in chemical ionization mode in the presence of the $CH_4$ reactant gas. A few grains of the sample are introduced into a droplet and the introduction pipe is heated to 450° C. under the standard conditions for analysis by mass spectrometry: P=$1.8 \times 10^{-6}$ torr and T source=250° C.

The melting temperature (Tm) and glass transition temperature (Tg) were determined by differential scanning calorimetry (DSC) using a Mettler DSC822e apparatus, respectively at a rate of 10° C./min and 40° C./min. The melting temperature (Tm) can also be determined by differential thermal analysis (DTA) using a Prophy 3 apparatus, at a rate of 10° C./min.

Groups A to E

Synthesis of Various 2,5-diketopiperazine Groups (DKP Groups)

Group A 3,6-bis(4-hydroxybenzyl)piperazine-2,5-dione

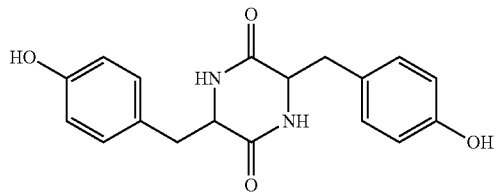 [SMILES: O=C1NC(Cc2ccc(O)cc2)C(=O)NC1Cc1ccc(O)cc1]

151.5 g (0.776 mol) of L-tyrosine methyl ester are placed in a glass reaction vessel fitted with a mechanical stirrer and a condenser. The temperature is gradually brought to 140° C. under an inert atmosphere. When the reaction medium becomes liquid, the reaction is prolonged for 5 h. At the end of the synthesis, the solid reaction medium is cooled to ambient temperature, and then reduced to powder so as to be washed with demineralized water at 80° C. using 75 ml of water per gram of reaction medium. After cooling to ambient temperature, filtration and rinsing with demineralized water, the solid which has an ecru appearance is dried under vacuum at 90° C. overnight, to give 67.72 g (0.207 mol) of the desired diketopiperazine. The yield is 53%.

The $^1$H NMR analysis confirms the structure which is in the form of two isomers: (L,L)-3,6-bis(4-hydroxybenzyl)piperazine-2,5-dione and (L,D)-3,6-bis(4-hydroxybenzyl)piperazine-2,5-dione.

Its melting temperature determined by DTA is a multimodal endotherm centered on 280° C.

$^1$H NMR (DMSO-d6):
(L,L) isomer: δ 9.2 (OH); d 7.7 (NH); δ 6.85-6.68 (CH aromatic); δ 3.86 (CH); δ 2.54 and 2.13 (CH$_2$) (L,D) isomer: δ 9.2 (OH), δ 7.9 (NH); δ 6.90-6.62 (CH aromatic); δ 3.3 (CH); δ 2.90 and 2.60 (CH$_2$)

MS: theoretical mass−experimental mass=326.1266−326.1271=0.5 mDa.

Group B 3,6-dibenzylpiperazine-2,5-dione

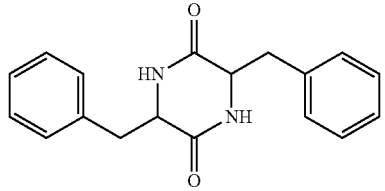 [SMILES: O=C1NC(Cc2ccccc2)C(=O)NC1Cc1ccccc1]

30.0 g (0.182 mol) of L-phenylalanine are placed in a glass reaction vessel fitted with a condenser. The temperature is gradually brought to 260° C. under an inert atmosphere. The reaction, which takes place in the solid state, is prolonged for 1 h 30. At the end of synthesis, the solid reaction medium is cooled to ambient temperature, and then solubilized in dimethyl sulfoxide at 160° C. using 10 ml of solvent per gram of reaction medium. After cooling to ambient temperature, filtration and rinsing with methanol, the solid which has a beige cotton-wool appearance is dried under vacuum at 90° C. overnight, to give 18.7 g (0.064 mol) of the desired diketopiperazine. The yield is 35%. Its melting temperature determined by DTA is 313° C.

$^1$H NMR (DMSO-d6): δ 7.9 (NH); δ 7.28-7.04 (CH aromatic); δ 3.90 (CH); δ 2.59 and 2.23 (CH$_2$)

MS: theoretical mass−experimental mass=294.1368−294.1334=3.4 mDa.

Group C 3-(carboxymethyl)-6-benzylpiperazine-2,5-dione

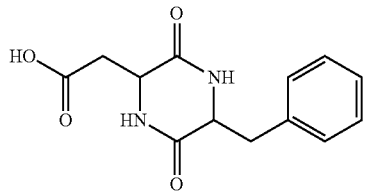 [SMILES: O=C(O)CC1NC(=O)C(Cc2ccccc2)NC1=O]

157.0 g (0.533 mol) of L-aspartyl-L-phenylalanine methyl ester are placed in a glass reaction vessel fitted with a mechanical stirrer and a condenser. The temperature is gradually brought to 200° C. under an inert atmosphere. The reaction, which takes place in the solid state, is prolonged for 1 h 30. At the end of synthesis, the reaction medium is cooled to ambient temperature, to give 135.85 g (0.518 mol) of 3-(carboxymethyl)-6-benzylpiperazine-2,5-dione. The yield is 97%. The melting temperature determined by DSC is 250° C.

$^1$H NMR (DMSO-d6): δ 12.2 (OH); δ 8.1 and 7.8 (NH); δ 7.30-7.19 (CH aromatic); δ 4.22 (CH phenylalanyl); δ 4.04 (CH aspartyl); δ 3.11 and 2.94 (CH$_2$ phenylalanyl); δ 2.05 and 1.59 (CH$_2$ aspartyl)

MS (reactant gas: NH$_4$): theoretical mass−experimental mass=262.0948−262.0982=3.4 mDa.

Group D

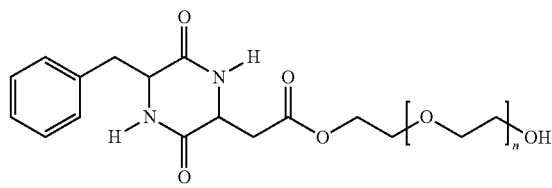

9.95 g (38.0 mmol) of the DKP group C prepared above and 22.78 g (38.0 mmol) of POGOL600 (a polyethylene glycol of which the number-average molar mass is 600 g/mol) are placed, while flushing with nitrogen, in a glass reaction vessel fitted with a mechanical stirrer and a condenser. The bath temperature is gradually brought to 220° C., at which point a condensation phenomenon is observed. The reaction is prolonged for 1 h.

Group E

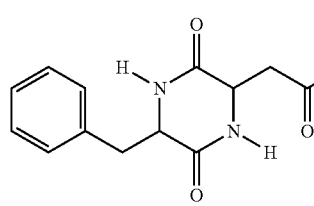 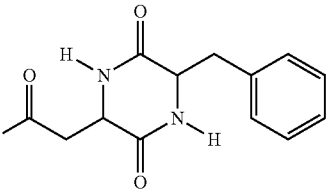

10.02 g (38.2 mmol) of the DKP group C prepared above and 2.22 g (19.1 mmol) of hexamethylenediamine are placed, while flushing with nitrogen, in a glass reaction vessel fitted with a mechanical stirrer and a condenser. The bath temperature is gradually brought to 240° C., at which point a condensation phenomenon is observed. The reaction is prolonged for 1 h.

Examples 1 to 4

Supramolecular Polymers Containing DKP Groups Alone and Preparation of Test Specimens where Appropriate Example 1

13 g (0.040 mol) of the DKP group A prepared above are introduced in powder form via the air-lock of a DSM MIDI 2000 micro-extruder ("micro-compounder") (15 cm$^3$), preheated to 310° C. After a mixing time of two minutes at 100 rpm, the product, which is very fluid, is poured into a parallelepipedal mold (width 12.5 mm, thickness 4 mm, length 60 mm) so as to form a test specimen. After cooling, the test specimen is removed from the mold: it is brittle. Its melting temperature determined by DTA is a multimodal endotherm centered on 270° C. The $^1$H NMR analysis gives the same chemical shifts as those of the DKP group A.

Example 2

13 g (0.091 mol) of alanine anhydride in powder form are processed via the process detailed in example 1. The micro-extruder is in this case preheated to 300° C. The test specimen formed is brittle. Its melting temperature determined by DTA is 277° C. The $^1$H NMR spectrum corresponds to that of the initial alanine anhydride.

Example 3

13 g (15.4 mmol) of the DKP group D prepared above are processed via the process detailed in example 1. The micro-extruder is in this case preheated to 200° C. After cooling to ambient temperature, the material is an elastomeric paste.

Example 4

13 g (21.5 mmol) of the DKP group E prepared above are processed by the process detailed in example 1. The micro-extruder is in this case preheated to 200° C. The material is solid at ambient temperature and has a vitreous appearance. When the material undergoes quenching, it is completely vitreous and its glass transition determined by DSC is 104° C.

Examples 5 and 6

Supramolecular Polymers Containing Mixtures of DKP Groups and Preparation of Test Specimens where Appropriate Example 5

1.03 g (3.5 mmol) of the DKP group B prepared above and 0.50 g (3.5 mmol) of alanine anhydride in powder form are introduced into a test tube and gradually brought to 290° C. under an inert atmosphere, until the mixture is liquid and homogeneous. After cooling to ambient temperature, the solid material is brittle. Its melting temperature determined by DTA is 242° C., whereas the melting temperature determined by DTA of the DKP group B and of the alanine anhydride are respectively 313° C. and 275° C. The $^1$H NMR spectrum confirms the coexistence of the structures of the DKP group B and of the alanine anhydride.

Example 6

5.8 g (0.051 mol) of glycine anhydride and 7.2 g (0.051 mol) of alanine anhydride are processed via the process detailed in example 1. The micro-extruder is in this case preheated to 300° C. The test specimen formed is brittle. Its melting temperature determined by DTA is 254° C., whereas the melting temperature determined by DTA of the glycine anhydride and of the alanine anhydride are respectively 320° C. and 275° C. The $^1$H NMR spectrum confirms the coexistence of the structures of the glycine anhydride and of the alanine anhydride.

Examples 7 to 12

Supramolecular Polymers Containing DKP Groups and Repeat Units Other than DKP and Preparation of Test Specimens where Appropriate Example 7

9.0 g (27.6 mmol) of the DKP group A prepared above and 4.0 g (27.6 mmol) of adipic acid are processed via the process detailed in example 1. The micro-extruder is in this case preheated to 270° C. The test specimen formed is brittle. When the material undergoes quenching, it may be in the amorphous state and its glass transition determined by DSC is

Example 8

6.4 g (45.0 mmol) of alanine anhydride and 6.6 g (45.0 mmol) of adipic acid are processed via the process detailed in example 1. The micro-extruder is in this case preheated to 220° C. The test specimen formed is brittle. Its melting temperature determined by DTA is 131° C. The $^1$H NMR spectrum confirms the coexistence of the structures of the alanine anhydride and of the adipic acid.

Example 9

0.70 g (2.1 mmol) of the DKP group A prepared above and 0.25 g (2.1 mmol) of hexamethylenediamine are introduced into a test tube and gradually brought to 210° C. under an inert atmosphere, until the mixture has the appearance of a paste. After cooling to ambient temperature, the material is an elastomeric paste. Its glass transition temperature determined by DSC at 10° C./min is 52° C. The $^1$H NMR spectrum confirms the coexistence of the structures of the DKP group A and of the hexamethylenediamine.

Example 10

10.4 g (31.9 mmol) of the DKP group A prepared above and 2.6 g of Technyl SB27A00 polyamide 66 in powder form are processed via the process detailed in example 3. The micro-extruder is in this case preheated to 270° C. The test specimen formed is moderately brittle. The material has a glass transition determined by DSC of 87° C., and a multi-modal melting endotherm of which the value at the peak is 268° C. The $^1$H NMR spectrum confirms the coexistence of the structures of the DKP group A and of the polyamide 66.

Example 11

0.50 g (1.5 mmol) of the DKP group A prepared above and 0.92 g of Jeffamine ED600 (a polyethylene glycol of which the chain ends are amine functions and the number-average molar mass of which is 600 g/mol) are introduced into a test tube and gradually brought to 270° C. under an inert atmosphere. After 5 minutes at 270° C., the mixture is a homogeneous liquid. After cooling to ambient temperature, the material is an elastomeric paste, whereas Jeffamine ED600 is a liquid at ambient temperature. The $^1$H NMR spectrum confirms the coexistence of the structures of the DKP group A and of the Jeffamine ED600.

Example 12

0.50 g (1.5 mmol) of the DKP group A prepared above and 0.92 g of POGOL600 (a polyethylene glycol of which the number-average molar mass is 600 g/mol) are introduced into a test tube and gradually brought to 285° C. under an inert atmosphere until the mixture is a homogeneous liquid. After cooling to ambient temperature, the material is an elastomeric paste, whereas the POGOL600 is a viscous liquid at ambient temperature. The $^1$H NMR spectrum confirms the coexistence of the structures of the DKP group A and of the POGOL600.

Examples 13 and 14

Characterization of the Macroscopic Properties of the Test Specimens and of the Supramolecular Polymers

Example 13

Dynamic mechanical analysis (DMA) is carried out using a TA Instruments Q800 apparatus on the test specimens obtained in examples 1, 2, 6, 8 and 10. The measuring tool known as "three-point bending with double clamping" is used. This tool is made up of two parts: the external part is made up of two clamps which hold the sample, a third clamp holding the test specimen tight at the center. The whole assembly is located in an environment of which the temperature can be regulated (the measuring tools and the test specimen are placed in an oven heated by a heat gun supplied with dry nitrogen).

A sinusoidal deformation (frequency 1 Hz, amplitude 0.05%) is then applied to the sample. This deformation generates a force which produces a stress that makes it possible to attain the values of elastic modulus E'. These measurements are carried out by following a temperature ramp of −150° C. to 250° C. at a rate of 2° C./min: it is then possible to reconstruct the curves of the moduli as a function of temperature.

The glass transition temperature (Tg), softening temperature (Ts) and modulus values measured are indicated in table (a):

TABLE (a)

| Sample | E' at 0° C. GPa | E' at 25° C. GPa | E' at 100° C. GPa | Tg ° C. | Ts ° C. |
|---|---|---|---|---|---|
| Example 1 | 0.4 | 0.4 | 0.4 | — | 225 |
| Example 2 | 0.4 | 0.4 | 0.4 | — | >250 |
| Example 6 | 0.7 | 0.7 | 0.9 | — | 235 |
| Example 8 | 1.3 | 1.4 | 1.5 | — | 140 |
| Example 10 | 2.2 | 2.2 | 1.6 | 89 | 190 |

Example 14

The rheometric analysis is carried out on the pastes obtained in examples 11 and 12 using a Rheometrics ARES apparatus, equipped with a 2000 g·cm measuring cell. The measuring tool with a geometry known as "plate-plate", a diameter of 25 mm and a gap of 1.5 mm is used. The sample is placed between two plates. The whole assembly is located in a chamber of which the temperature is regulated at 60° C. A rotational speed is applied to the bottom plate. It is then possible to calculate a stress τ linked to the torque measured on the top plate and a shear gradient γ proportional to the rotational speed of the lower plate, making it possible to perform a flow sweep from 0.1 to 100 s$^{-1}$. Finally, the viscosity at a given speed gradient is obtained using the following formula: $\eta = \tau/\gamma$.

The compositions of examples 11 and 12 have particular behaviors of material at yield. This yield stress can be interpreted as the stress below which no deformation of the material occurs and above which reversible bonds of the supramolecular material are broken, allowing the viscous component of the material to be expressed.

The viscosity (η) and yield stress ($\sigma_{yield}$) values are indicated in table (b):

TABLE (b)

| Sample | η at 0.1 s$^{-1}$ (kPa·s) | η at 1 s$^{-1}$ (kPa·s) | η at 10 s$^{-1}$ (kPa·s) | $\tau_{yield}$ (kPa) |
|---|---|---|---|---|
| Example 11 | 102 | 3 | 0.1 | 5.7 |
| Example 12 | 54 | 7 | 0.3 | 4.4 |

The invention claimed is:

1. A composition comprising a supramolecular polymer, wherein the supramolecular polymer comprises a plurality of different repeat units linked to one another via hydrogen bonds, wherein at least one of said repeat units contains a 2,5-diketopiperazine group, wherein another repeat unit, that is different from the repeat unit containing the 2,5 diketopiperazine group, is selected from the group consisting of a polyamide, a copolyamide, a polyurethane, a polyurethane, a polyurea, a polyester, a polyesteramide, a polyimine, a polycarbonate, a polyether, an amine, a diacid, an alcohol, a ureide, urea, 6-aminocaproic acid, 11-aminoundecanoic acid, and a molecule bearing imidazolidone function, and wherein the composition, at ambient temperature, is in the form of a paste or of a semicrystalline or amorphous solid.

2. The composition as claimed in claim 1, wherein the 2,5-diketopiperazine group (DKP group) corresponds to formula (1):

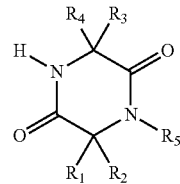

(1)

in which $R_1$, $R_2$, $R_3$, $R_4$ and $R_5$, which are identical or different, represent:
an atom, or
a saturated or unsaturated, linear, branched, comb, or star hydrocarbon-based group, which can optionally contain one or more heteroatoms.

3. The composition as claimed in claim 2, wherein the heteroatoms are selected from the group consisting of N, O, S, Si, P, and halogens.

4. The composition as claimed in claim 2, wherein the hydrocarbon-based group is selected from the group consisting of:
a cycloalkyl group containing from 3 to 20 carbon atoms, and preferentially from 4 to 12 atoms,
an aromatic group containing from 6 to 20 carbon atoms,
an alkyl group containing from 1 to 20 carbon atoms, and
an alkylaryl or arylalkyl group containing from 6 to 20 carbon atoms.

5. The composition as claimed in claim 4, wherein the hydrocarbon-based group is selected from the group consisting of cyclohexyl, phenyl, hydroxyphenyl, benzyl, and tolyl groups.

6. The composition as claimed in claim 2, wherein one or more of the radicals $R_1$, $R_2$, $R_3$, $R_4$, and $R_5$, which are identical or different, represent conventional polymers or oligomers having repeat units linked via covalent bonds.

7. The composition as claimed in claim 6, wherein the polymers or oligomers are selected from the group consisting of polyoxyalkylenes, polyamides, polyesters, polyureas, polyurethanes, polycarbonates, polyacrylic acids, polyolefins, polyvinyls, and polystyrenes.

8. The composition as claimed in claim 2, wherein, in formula (1), the radicals $R_1$ to $R_5$ contain one or more H-bond donor and/or acceptor groups selected from the group consisting of amines, alcohols, thiols, carboxylic acids, esters, amides, imides, thioamides, ethers, sulfides, imines, azos, sulfones, sulfonates, sulfonamides, ureas, ureidos, guanidos, cyanos, carbamates, ketones, aldehydes, carbonates, silanols, halogens, metal hydroxides, and metal carbonyls.

9. The composition as claimed in claim 2, wherein, in formula (1), $R_1$=$R_3$=H.

10. The composition as claimed in claim 1, wherein the 2,5-diketopiperazine group of formula (1) is substituted symmetrically.

11. The composition as claimed in claim 10, wherein the 2,5-diketopiperazine (DKP) group is 3,6-bis(4-hydroxybenzyl)piperazine-2,5-dione of formula (6):

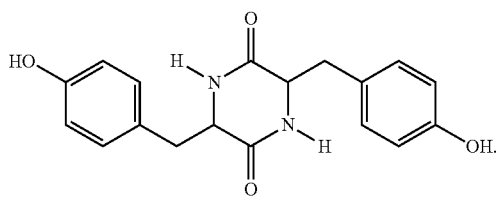

(6)

12. The composition as claimed in claim 1, wherein the 2,5-diketopiperazine group of formula (1) is substituted nonsymmetrically.

13. The composition as claimed in claim 2, wherein the supramolecular polymer comprises a mixture of 2,5-diketopiperazine groups of formula (1).

14. A process for synthesizing a supramolecular polymer of the composition of claim 1, the process comprising mixing the repeat units associated via hydrogen bonds and the other constituents of said supramolecular polymer in solution, in suspension, in an emulsion, by molten mixing, or as solids.

15. The composition as claimed in claim 1, further comprising one or more reinforcing or bulking fillers and, optionally, one or more additives.

16. The composition as claimed in claim 15, wherein the composition comprises from 30 to 95% by weight of supramolecular polymer, relative to the total weight of the composition.

17. The composition as claimed in claim 15, wherein the reinforcing or bulking fillers are selected from the group consisting of: glass fibers, carbon fibers, natural fibers, aramid fibers, nanotubes, hemp, flax, lamellar particulate fillers and/or exfoliable or nonexfoliable nanofillers, polymeric fillers, glass beads, and glass powder.

18. The composition as claimed in claim 15, wherein the additives are selected from the group consisting of lubricants, flame retardants, plasticizers, nucleating agents, impact modifiers, catalysts, light and/or heat stabilizers, antioxidants, antistatic agents, dyes, matting agents, molding aids, and other conventional additives.

19. The composition as claimed in claim 4, further comprising a thermoplastic polymer not interacting via H bonding with the supramolecular polymer.

20. The composition as claimed in claim 19, wherein the composition comprises from 30 to 95% by weight of supramolecular polymer, relative to the total weight of the composition.

21. Articles obtained by forming a composition as claimed claim 1 by means of an extrusion, injection-molding, molding, extrusion-blow molding, rotomolding, or thermoforming process.

22. The composition of claim 1, wherein the polyamide or copolyamide comprises polyamide 6, polyamide 11, polyamide 12, polyamide 46, polyamide 66, polyamide 610, polyamide 6T, or polyamide MXD6.

23. The composition of claim 1, wherein the polyester comprises polyethylene terephthalate (PET), polybutylene terephthalate (PBT), polytrimethylene terephthalate (PTT), or polylactic acid (PLA).

24. The composition of claim 1, wherein the polyether comprises polyethylene glycol or polyetheramine.

25. The composition of claim 1, wherein the amine comprise hexamethylenediamine or melamine.

26. The composition of claim 1, wherein the diacid comprises adipic acid or terephthalic acid.

27. The composition of claim 1, wherein the alcohol comprises hydroquinone.

\* \* \* \* \*

UNITED STATES PATENT AND TRADEMARK OFFICE
CERTIFICATE OF CORRECTION

| | | |
|---|---|---|
| PATENT NO. | : 9,012,567 B2 | Page 1 of 1 |
| APPLICATION NO. | : 13/388674 | |
| DATED | : April 21, 2015 | |
| INVENTOR(S) | : Thierry Badel, Stéphane Jeol and Franck Touraud | |

It is certified that error appears in the above-identified patent and that said Letters Patent is hereby corrected as shown below:

In the title page, item (75), please replace Thierry Badel, Lyons (FR) with --Thierry Badel, Lyon (FR);-- and replace Stéphane Jeol, Lyons (FR) with --Stéphane Jeol, Cumming, GA (US)--

Signed and Sealed this
Second Day of August, 2016

Michelle K. Lee
*Director of the United States Patent and Trademark Office*